US006358437B1

(12) United States Patent
Jonas et al.

(10) Patent No.: US 6,358,437 B1
(45) Date of Patent: Mar. 19, 2002

(54) SCREEN PRINTING PASTE FOR PRODUCING ELECTRICALLY CONDUCTIVE COATINGS

(75) Inventors: Friedrich Jonas, Aachen; Udo Guntermann, Krefeld, both of (DE)

(73) Assignee: Bayer Aktiengesellschaft, D-51368 Leverkusen (DE)

( * ) Notice: Subject to any disclaimer, the term of this patent is extended or adjusted under 35 U.S.C. 154(b) by 0 days.

(21) Appl. No.: 09/581,600

(22) PCT Filed: Dec. 10, 1998

(86) PCT No.: PCT/EP98/08075

§ 371 Date: Jun. 14, 2000

§ 102(e) Date: Jun. 14, 2000

(87) PCT Pub. No.: WO99/34371

PCT Pub. Date: Jul. 8, 1999

(30) Foreign Application Priority Data

Dec. 23, 1997 (DE) .......................................... 197 57 542

(51) Int. Cl.⁷ .............................. H01B 1/20; B05D 5/12
(52) U.S. Cl. .......................................... 252/500; 427/96
(58) Field of Search .............................. 252/500; 427/96

(56) References Cited

U.S. PATENT DOCUMENTS

| 5,006,278 A | * | 4/1991 | Elsenbaumer | 427/385.5 |
| 5,300,575 A | * | 4/1994 | Jonas et al. | 525/186 |
| 5,370,981 A | * | 12/1994 | Kraft et al. | 430/529 |
| 6,004,483 A | * | 12/1999 | Jonas et al. | 252/500 |
| 6,083,635 A | * | 7/2000 | Jonas et al. | 428/690 |
| 6,157,479 A | * | 12/2000 | Heuer et al. | 359/265 |

FOREIGN PATENT DOCUMENTS

EP 713140 * 5/1996

* cited by examiner

*Primary Examiner*—Mark Kopec
(74) *Attorney, Agent, or Firm*—Joseph C. Gil; Diderico van Eyl

(57) ABSTRACT

The present invention relates to a screen printing paste having a viscosity of from 1 to 200 dPas, comprising a solution or dispersion of a conductive polymer and optionally binders, thickeners and fillers, and to the use thereof for the production of electrically conductive coatings.

7 Claims, No Drawings

SCREEN PRINTING PASTE FOR PRODUCING ELECTRICALLY CONDUCTIVE COATINGS

FIELD OF THE INVENTION

The present invention relates to a screen printing paste for the production of electrically conductive coatings.

BACKGROUND OF THE INVENTION

Electrically conductive organic polymers for the production of conductive coatings are known in principle. EP-A 440 957 discloses, for example, specific polythiophene derivatives for the production of antistatic coatings. EP-A 686 662 teaches the combination of these polythiophene derivatives and specific hydroxyl-substituted additives for the production of highly conductive, transparent electrodes for display applications, for example electroluminescent displays. The conductive layers described therein are generally applied over the full area, for example by pouring. However, for many applications it is necessary to apply structured electrodes of the conductive polythiophene derivatives. A process for the production of structured coatings which is widely employed in industry is screen printing. In practice, it has been found that the coating solutions described in EP-A 440 957 are not suitable for application by screen printing since the viscosity of the polythiophene solutions is too low.

The object of the invention was therefore to prepare printing pastes which are based on conductive polymers and are suitable for screen printing. Surprisingly, it has been found that addition of additives or use of suitable processes in the preparation of the conductive polymers enables the viscosity of the solutions to be increased sufficiently for the solutions to be processable by screen printing without the conductivity of the finished coatings being significantly impaired.

SUMMARY OF THE INVENTION

The invention relates to screen printing pastes having a viscosity of from 1 to 200 dPas, comprising a solution or dispersion of a conductive polymer and optionally binders, thickeners and fillers.

DESCRIPTION OF THE INVENTION

Suitable conductive polymers are polythiophenes, optionally substituted polypyrroles (for example Conquests® from DSM N.V.) or polyanilines (for example Versicon® from Ormecon). The screen printing pastes according to the invention are preferably prepared using polythiophenes, in particular 3,4-polyethylenedioxythiophene.

The screen printing pastes according to the invention preferably comprise 3,4-polyethylenedioxythiophene cations and polystyrene sulphonate anions, where their content in the screen printing pastes according to the invention is particularly preferably greater than or equal to 2% by weight. These solutions can be prepared, for example, by evaporating (preferably under reduced pressure) a commercially available solution containing 1.3% by weight of 3,4-polyethylenedioxythiophene/polystyrene sulphonate. This is surprising since it has been found that the direct preparation of solutions having solids contents of greater than 2% by weight is not possible without gelling of the solution and formation of solid particles occurring.

Solvents which are suitable for the preparation of the screen printing pastes are water; at least partially water-miscible alcohols, such as methanol, ethanol, isopropanol, propanol, butanol, glycols, such as ethylene glycol, propylene glycol, glycol acetate, glycol butyrate and methoxypropyl acetate; ketones, such as acetone, methyl ethyl ketone, methyl isobutyl ketone and diacetone alcohol; and amides, such as N,N-dimethylacetamide, N,N-dimethylformamide, N-methylpyrrolidone and N-methylcaprolactam.

The viscosity of the screen printing pastes is adjusted to values of from 1 to 200 dPas, preferably from 10 to 100 dPas.

In order to adjust the viscosity, thickeners and/or binders can be added to the solutions or dispersions of the conductive polymers. Suitable thickeners and binders are, for example, carrageenans, thickeners based on polyurethane (for example Borchigel L 75 from Borchers), polysaccharides, polyacrylates, polyvinylpyrrolidone, polyethylene oxides, agar agar, tragant, gum arabic, alginates, pectins, guar flour, carob kernel flour, starch, dextrins, gelatine, casein, carboxymethylcellulose and other cellulose ethers, hydroxyethylcellulose, hydroxypropylcellulose, polyurethanes, polyvinyl acetates, polystyrene, polycarbonate, polyester, polyvinyl alcohol and polyamides. The thickeners and/or binders based on organic monomers can be used as homopolymers or also as copolymers. They can be employed as water-soluble or water-dispersible or emulsifiable polymers. In order to improve the water compatibility, it has proven successful to use partially sulphonated polymers.

The thickeners and/or binders are added to the solutions of conductive polymer in an amount of from 0 to 10000%, preferably from 50 to 1000%, based on the solids content.

Suitable additives for increasing the conductivity of the coating are, for example, sugar alcohols, such as sorbitol, mannitol, saccharose and fructose, as described in EP-A 686 662.

It is also possible to add fillers to the screen printing pastes in order to achieve the desired rheology. Suitable fillers are metal oxides, such as titanium dioxide, zinc oxide and aluminium oxide; electrically conductive metal oxides, such as indium-tin oxide and antimony-tin oxide; metals, such as silver, copper, gold, palladium and platinum; silicon dioxide, silicates, silicas, polysilicic acids, zeolites, alkaline earth metal carbonates, such as calcium carbonate, phyllosilicates and clay minerals, such as montmorillonites or bentonites.

If transparent coatings are to be produced, the diameter of the particles must be below the wavelength of visible light; it is preferably from 5 to 400 nm. For the production of opaque coatings, the particle size can also be above the wavelength of visible light; it is then preferably from 0.4 to 20 $\mu$m.

In the case of the addition of the conductive metal oxides, synergistic effects can take effect, i.e. the conductivity of the coatings from the combination of conductive metal oxide and conductive polymer is greater than the conductivity of a coating of the individual components.

Based on the solids content of conductive polymer in the screen printing paste, from 0 to 1000% by weight, preferably from 0 to 200% by weight, of filler are added to the screen printing paste.

It is furthermore possible to add crosslinking agents, such as epoxysilanes (for example 3-glycidoxypropyltrimethoxysilane), silane hydrolysates (for example hydrolysates of tetraethoxysilane) or di- or oligoisocyanates, optionally in masked form, to the screen printing pastes.

Furthermore, for the production of coloured electrodes, the screen printing pastes can be coloured by addition of organic or inorganic soluble dyes or dye-pigments.

In order to improve the wetting behaviour of the pastes and the surface properties of the printed electrodes, flow-control agents and/or surfactants and/or antifoams can furthermore be added to the screen printing pastes.

The screen printing paste can be prepared by simple mixing of the conductive polythiophene solution or dispersion with the other constituents, such as fillers, binders, thickeners and/or crosslinking agents. In the case of incorporation of solid fillers, mixing by means of dispersion equipment, for example ball mills and dissolvers, has proven successful.

The coating thickness is from 10 nm to 500 μm, preferably from 50 nm to 10 μm. Depending on the coating thickness, the printed coatings have surface resistance values of from 1 to $10^8 \Omega/\square$, preferably from 50 to 10000 $\Omega/\square$.

The screen printing pastes according to the invention can be processed in commercially available screen printing machines with polyester or metal screen coverings. Processing by rotary-screen printing or pad printing is likewise possible.

After the printing, the coatings are dried. Suitable drying temperatures are from 0° C. to 250° C. The drying is preferably carried out at elevated temperature. The drying time is from a few seconds to several hours, preferably from 10 seconds to 15 minutes.

The screen printing pastes are preferably used for the production of transparent electrodes for electroluminescent displays based on inorganic luminophores, such as zinc sulphide, or organic luminophores, such as poly-para-phenylenevinylene derivatives. The screen printing pastes can furthermore be used for the production of electrodes for liquid crystal displays or thin film transistor (TFT) addressed LCDs or as the basis for electrochemical deposition of metals, for example in the circuit board industry.

The invention is further described in the following illustrative examples in which all parts and percentages are by weight unless otherwise indicated.

EXAMPLES

Example 1

A commercially available 3,4-polyethylenedioxythiophene/polystyrene sulphonate solution (Baytron® P, Bayer A G) having a solids content of 1.3% by weight is evaporated to a solids content of 3.0% by weight at 45° C. and 20 mbar in a rotary evaporator. After addition of 25 g of N-methylpyrrolidone and 7.5 g of 3-glycidoxypropyltrimethoxysilane, 225 g of this solution are stirred at 8000 rpm for 10 minutes using a dissolver. The screen printing paste obtained has a viscosity of 8 dPas. The paste is printed using a polyester fabric screen having 77 filaments per cm (Estal® mono from Sefar) to give a 5*5 cm² coating and dried at 130° C. for 5 minutes. The coating is transparent and has a surface resistance of 1100 $\Omega/\square$, measured in accordance with DIN IEC 93.

Example 2

A commercially available 3,4-polyethylenedioxythiophene/polystyrene sulphonate solution (Baytron® P, Bayer A G) having a solids content of 1.3% by weight is evaporated to a solids content of 3.0% by weight at 45° C. and 20 mbar in a rotary evaporator. After addition of 25 g of N-methylpyrrolidone, 7.5 g of 3-glycidoxypropyltrimethoxysilane, 2.6 g of Na polyacrylate (Mirox® TBN from Stockhausen) and 51.5 g of methoxypropyl acetate, 225 g of this solution are stirred at 8000 rpm for 10 minutes using a dissolver. The screen printing paste obtained has a viscosity of 30 dPas. The paste is printed using a polyester fabric screen having 77 filaments per cm (Estal® mono from Sefar) to give a 5*5 cm² coating and dried at 130° C. for 5 minutes. The coating is transparent and has a surface resistance of 1000 •/$\square$, measured in accordance with DIN IEC 93.

Although the present invention has been described in detail with reference to certain preferred versions thereof, other variations are possible. Therefore, the spirit and scope of the appended claims should not be limited to the description of the versions contained therein.

What is claimed is:

1. A screen printing paste comprising a solution or a dispersion containing a conductive polymer and a solvent selected from the group consisting of at least partially water-miscible alcohols, ketones, and amides; and having a viscosity ranging from 8 to 200 dPas, wherein said paste contains at least 2% by weight of said conductive polymer.

2. The paste of claim 1, wherein the paste further comprises binders, thickeners fillers, or mixtures thereof.

3. The paste of claim 1, wherein the conductive polymer comprises 3,4-polyethylenedioxythiophene.

4. The paste of claim 3, wherein the conductive polymer comprises 3,4-polyethylenedioxythiophene cations and polystyrene sulphonate anions.

5. The screen printing paste according to claim 4, wherein the content of 3,4-polyethylenedioxythiophene/polystyrene sulphonate is more than 2% by weight.

6. A process for the preparation of the screen printing paste according to claim 5, comprising evaporating a solvent from a solution or dispersion having a content of less than 2% by weight of 3,4-polyethylenedioxythiophene/polystyrene sulphonate to a solids content of more than 2% by weight.

7. The process of claim 6, wherein the process further comprises adding a member selected from the group consisting of binders, thickeners, fillers or mixtures thereof.

* * * * *